Patented Sept. 10, 1929.

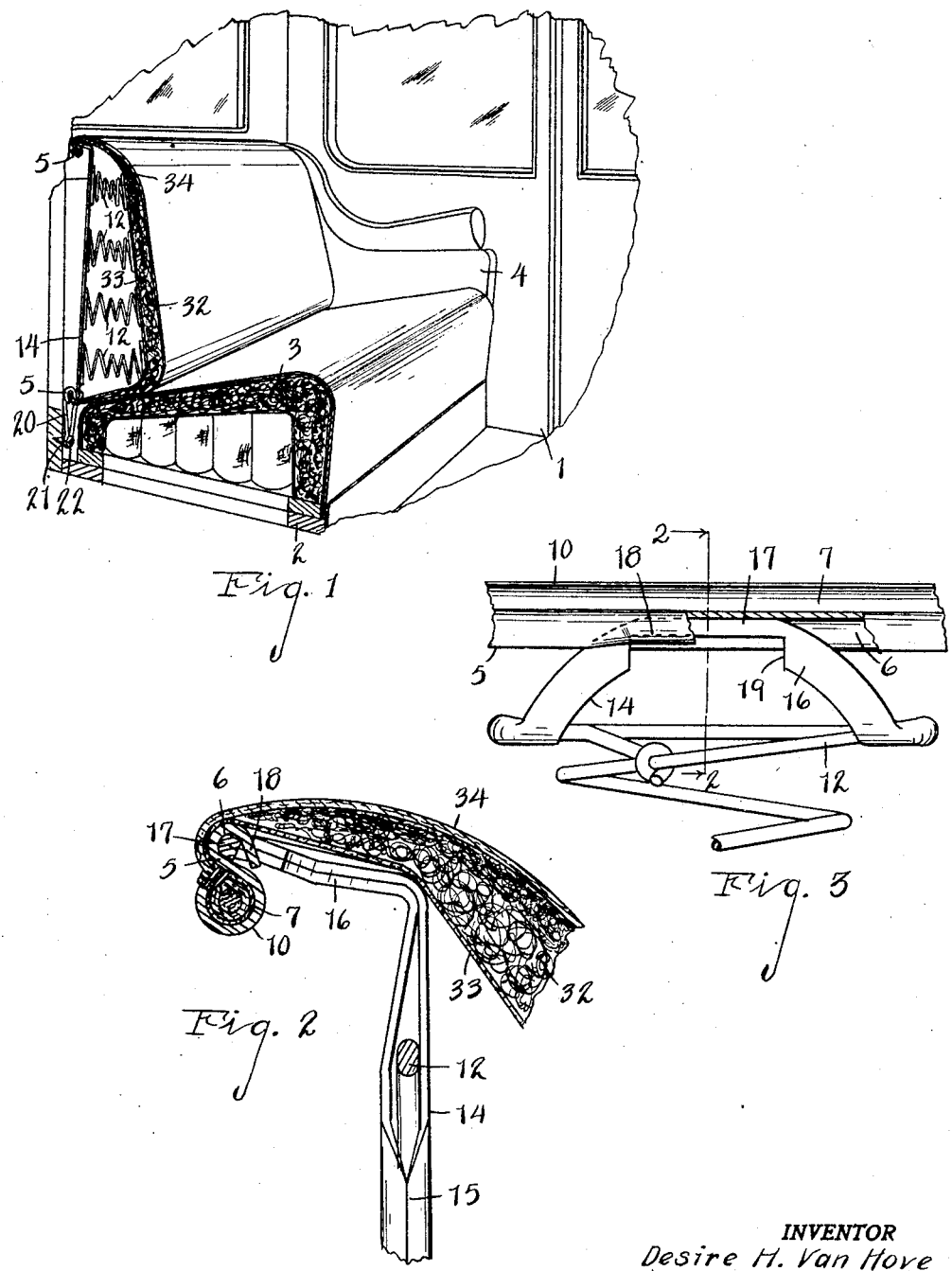

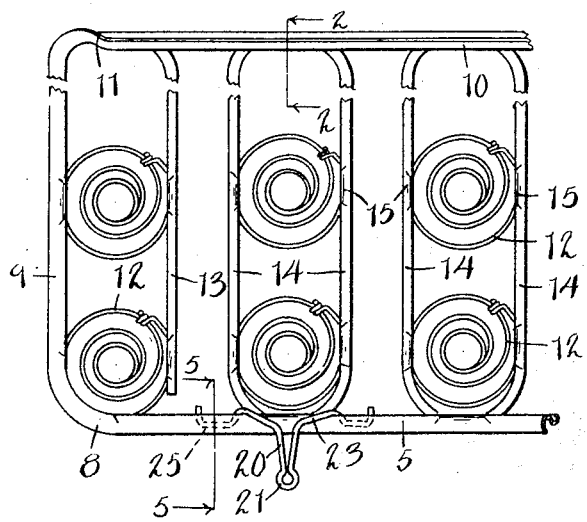
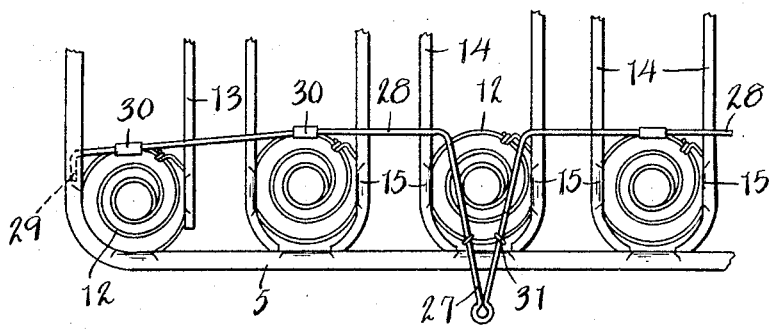
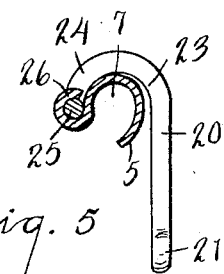

1,727,529

UNITED STATES PATENT OFFICE.

DESIRE H. VAN HOVE, OF DETROIT, MICHIGAN, ASSIGNOR TO L. A. YOUNG INDUSTRIES, INC., OF DETROIT, MICHIGAN.

UPHOLSTERY UNIT FOR VEHICLE BODIES AND THE LIKE.

Application filed August 1, 1927. Serial No. 209,864.

The main objects of this invention are:

First, to provide an upholstery unit adapted as a back spring for an automobile seat which may be quickly mounted in the vehicle body and eliminates the necessity for an overhanging finish or joint concealing part in the vehicle body.

Second, to provide an improved upholstery unit in which the edges of the upholstery are effectively secured to the frame, the securing means being concealed when the unit is mounted in the vehicle body.

Third, to provide an upholstery unit having these advantages which is very simple and economical to produce and in the application of the upholstery.

Fourth, to provide an improved means for securing the upholstery unit in position.

Objects relating to details and economies of construction and operation of my invention will appear from the detailed description to follow.

The invention is defined and pointed out in the claims.

A structure which is a preferred embodiment of my invention is illustrated in the accompanying drawing, forming a part of this application, in which:

Fig. 1 is a fragmentary view partially in section of a motor vehicle body embodying the features of my invention.

Fig. 2 is an enlarged detail section on a line corresponding to line 2—2 of Figs. 3 and 4 through the top portion of my improved upholstery unit.

Fig. 3 is a fragmentary view showing details of the mountings of the spring support on the top member of the frame.

Fig. 4 is a fragmentary inverted or bottom plan view of one of my improved upholstery units prior to application of the upholstery.

Fig. 5 is a detail section on line 5—5 of Fig. 4 showing details of the mounting or securing means for the unit.

Fig. 6 is a fragmentary rear or bottom view of a modified form of securing means.

In the drawing similar reference characters refer to similar parts throughout the several views.

Referring to the drawings, 1 represents a fragment of an automobile body, 2 the seat frame and 3 the seat cushion, and 4 the end upholstery of the seat. These parts are shown more or less conventionally.

My improved upholstery unit comprises a border frame 5 formed of a strip of metal and of S cross section providing an inwardly facing channel 6 and an outwardly facing channel 7. This frame is, in practice, formed of sections for convenience in manufacture, the sections however being joined to form a continuous outwardly facing channel for securing the upholstery and a continuous inwardly facing channel for securing the springs, either directly by clamping on the bottom coils of the springs or through spring supporting strips.

For convenience in description, I designate the parts of the frame as bottom frame member 8, side frame members 9 and top frame member 10.

The upholstery securing channels of the side frame members face laterally outward. The top frame member is rearwardly offset and given a lateral twist near the ends thereof or at the corners of the frame, as shown at 11, so that it faces rearwardly, as shown in Fig. 2.

The body springs 12 are secured by clamping the bottom coils of the side row of springs in an inwardly facing channel, (see the left hand of Fig. 4) and also through the supporting strips 13 and 14, the strips 13 being arranged to coact with the frame in supporting the side rows of springs, while the springs 14 are arranged in coacting facing pairs, being preferably formed in one piece bent into a loop with parallel side portions, as shown, these strips being of U cross section to receive the bottom coils of springs which are attached thereto by clamping as at 15.

The upper ends of the supporting strips 13 and 14 are rearwardly offset at 16, these offset ends having portions 17 clamped within the inwardly facing channel 6, the portions of the inwardly facing channel being crimped down, as at 18—see Figs. 2 and 3, to clamp the bights of the supporting strips.

These strips are notched at 19 to facilitate the engagement.

To provide means for securing the cushion, it is provided with loop-like attaching members 20 formed of wire with eyes 21 at their outer ends to receive attaching screws 22—see Fig. 1. The arms 23 of the attaching members are diverged and upwardly offset at 24, terminating in portions 25 which are clamped in the inwardly facing channel by folding portions 26 thereof over these parts 25. The attaching members are thus securely retained and underlie the bottom frame.

In the modification shown in Fig. 6, the attaching members 27 have laterally projecting arms 28 with terminals 29 clamped in the inwardly facing channels of the side members of the frame. This attaching member is secured to the bottom coils of the springs by clips 30 and 31.

The upholstery, designated generally by the numeral 32, is provided with an inner supporting fabric 33 and an outer covering 34, the edges of which are disposed in the outwardly facing channel of the frame and secured therein by clamping the channel thereon, as shown in Figs. 1 and 2.

This provides an upholstery unit in which the spring parts or metal parts are very economical to produce and the upholstery may be quickly applied thereto. The bottom and end edges are covered by the cushion and the end upholstery of the vehicle body while the covering is folded over the top edge so that the attaching means is not visible when the cushion is assembled. This avoids the necessity for a finishing strip along the top of the back or an overhanging ledge or the like.

I have illustrated and described my improvements in an embodiment which is very practical. I have not attempted to illustrate or describe various modifications and adaptations which I contemplate as it is believed this disclosure will enable those skilled in the art to embody or adapt my improvements as may be desired.

Having thus described my invention, what I claim as new and desire to secure by Letters Patent, is:

1. An upholstery unit comprising a frame member of S cross section providing an inner channel and an outer upholstery securing channel, the outer channel of the side and bottom members of the frame being disposed to face laterally, the top member of the frame being rearwardly offset and twisted adjacent the ends thereof so that its outer channel faces rearwardly, spring supporting strips of U cross section having their ends secured in the inner channel of the top and bottom frame member by clamping the same thereon, the upper ends of said spring supporting strips being rearwardly offset, springs having their bottom coils clamped in said spring supporting strips, and an upholstery covering having its edges clamped within said outer channel and thereby secured to the frame.

2. An upholstery unit comprising a frame member of S cross section providing an inner spring securing channel and an outer upholstery securing channel, the outer channel of the side and bottom members of the frame being disposed to face laterally, the top member of the frame being rearwardly offset and twisted adjacent the ends thereof so that its outer channel faces rearwardly, body springs, spring supporting strips having their ends rearwardly offset and clamped in the inner channel of the said top member of the frame, and an upholstery covering having its edges clamped within said outer channel.

3. An upholstery unit comprising a frame member of S cross section providing an inner spring securing channel and an outer upholstery securing channel, the outer channel of the side and bottom members of the frame being disposed to face laterally, the top member of the frame being rearwardly offset and twisted adjacent the ends thereof so that its outer channel faces rearwardly, body springs secured to said inner frame by said inner channel, and an upholstery covering having its edges clamped within said outer channel.

4. An upholstery unit comprising a border frame of S cross section providing an inner spring securing channel and an outer upholstery securing channel, a plurality of springs mounted on said frame through said inner channel, and an upholstery covering secured to said frame by clamping the outer channel upon the edge of the covering, said outer channel facing laterally on the sides and bottom of said frame and rearwardly at the top of said frame whereby the clamping edge of the frame is concealed at the top of the unit.

5. An upholstery unit comprising a frame member of S cross section providing an inner channel and an outer channel, the outer channel of the side and bottom members facing laterally of the frame, the top member of the frame being rearwardly offset and twisted adjacent its ends so that its outer channel faces rearwardly, body springs and spring supports clamped within the inner channel, and an upholstery covering having its edges clamped within the outer channel.

6. An upholstery unit comprising a frame member having a continuous outer channel, one member of the frame being rearwardly offset and disposed with its channel facing rearwardly, other members of the frame having their channels facing laterally, body springs mounted in said frame, and an upholstery covering having its edge secured in said continuous channel by clamping the channel thereon.

7. An upholstery unit comprising a frame member of S cross section providing an inner channel and an outer channel, a part of the members of the frame facing laterally and at least one member of the frame being disposed so that its outer channel faces rearwardly, body springs and spring supports clamped within the inner channel, and an upholstery covering having its edges clamped within the outer channel.

8. An upholstery unit comprising a frame member having a continuous outer channel, a part of the members of the frame being disposed with their channels facing laterally, at least one member of the frame being rearwardly offset and disposed with its channel facing rearwardly, body springs mounted in said frame, and an upholstery covering having its edge secured in said continuous channel by clamping the channel thereon.

9. An upholstery unit comprising a frame member having a continuous outer channel, a part of the members of the frame being disposed with their channels facing laterally, at least one member of the frame being disposed with its channel facing rearwardly, body springs mounted in said frame, and an upholstery covering having its edges secured in said continuous channel by clamping the channel thereon.

10. An upholstery unit comprising a frame member of S cross section providing an inner spring securing channel and an outer upholstery securing channel, and a projecting attaching member comprising a loop of wire having diverging arms at its inner end terminating in upwardly offset portions clamped within the inwardly facing channel.

11. An upholstery unit comprising a frame member of S cross section providing an inner spring securing channel and an outer upholstery securing channel, and a projecting attaching member having arms with offset portions clamped within the inwardly facing channel.

12. An upholstery unit comprising a frame member of S cross section providing an inner spring securing channel and an outer upholstery securing channel, and an attaching member having an arm with offset portion clamped within the inwardly facing channel.

In witness whereof I have hereunto set my hand.

DESIRE H. VAN HOVE.